United States Patent
Yoshihara et al.

(10) Patent No.: US 10,156,483 B2
(45) Date of Patent: Dec. 18, 2018

(54) TEMPERATURE SENSOR AND TEMPERATURE SENSOR MANUFACTURING METHOD

(71) Applicant: Shibaura Electronics Co., Ltd., Saitama (JP)

(72) Inventors: Takamasa Yoshihara, Saitama (JP); Michiru Takemura, Senboku (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 192 days.

(21) Appl. No.: 15/123,880

(22) PCT Filed: Dec. 17, 2014

(86) PCT No.: PCT/JP2014/006290
§ 371 (c)(1),
(2) Date: Sep. 6, 2016

(87) PCT Pub. No.: WO2015/132832
PCT Pub. Date: Sep. 11, 2015

(65) Prior Publication Data
US 2017/0016777 A1    Jan. 19, 2017

(30) Foreign Application Priority Data
Mar. 7, 2014  (JP) ................. 2014-044661

(51) Int. Cl.
*G01K 7/22*  (2006.01)
*G01K 1/08*  (2006.01)
*G01K 1/16*  (2006.01)

(52) U.S. Cl.
CPC ............. *G01K 7/22* (2013.01); *G01K 1/08* (2013.01); *G01K 1/16* (2013.01)

(58) Field of Classification Search
CPC ............. G01K 7/22; G01K 1/08; G01K 1/16
See application file for complete search history.

(56) References Cited

U.S. PATENT DOCUMENTS 3,646,494 A * 2/1972 Waseleski, Jr. .......... H01C 7/04
                                                     338/22 R
3,824,328 A   7/1974 Ting et al.
(Continued)

FOREIGN PATENT DOCUMENTS

DE    2351956        4/1974
EP    0809093 A1    11/1997
(Continued)

OTHER PUBLICATIONS

English Machine Translation of JPH 11144913 A—with drawings; Sasaki et al.; May 28, 1999; 9 pages.*
(Continued)

*Primary Examiner* — Lisa Caputo
*Assistant Examiner* — Philip Cotey
(74) *Attorney, Agent, or Firm* — Pearne & Gordon LLP

(57) ABSTRACT

A temperature sensor that includes a resin coating layer and is high in temperature detection accuracy is provided. The temperature sensor is provided with a resin coating layer that covers: an element body; and connection parts at which lead-out wires are respectively connected to lead wires. The resin coating layer includes an inner layer and an outer layer. The inner layer seals the element body and the connection parts, and is formed of PFA. The outer layer is disposed around the inner layer, and is formed of PTFE that has heat shrinkability and a melting point higher than a melting point of PFA. The outer layer has a rectangular-parallelepiped appearance shape and has a flat outer surface.

12 Claims, 12 Drawing Sheets

(56) References Cited

U.S. PATENT DOCUMENTS

| | | | | | |
|---|---|---|---|---|---|
| 5,367,282 | A | * | 11/1994 | Clem | G01K 1/08 338/22 R |
| 6,380,840 | B1 | | 4/2002 | Wienand et al. | |
| 2007/0110124 | A1 | * | 5/2007 | Shiraki | G01K 1/08 374/208 |
| 2009/0316752 | A1 | * | 12/2009 | Kawase | G01K 7/223 374/183 |
| 2013/0182745 | A1 | * | 7/2013 | Hertel | G01K 1/14 374/185 |

FOREIGN PATENT DOCUMENTS

| | | | |
|---|---|---|---|
| JP | H05-187045 A | | 7/1993 |
| JP | 11144913 A | * | 5/1999 |
| JP | 2004-233267 A | | 8/2004 |
| JP | 2010-123641 A | | 6/2010 |
| JP | 2012-084674 A | | 4/2012 |

OTHER PUBLICATIONS

Supplementary European Search Report for EP 14 88 4403 dated Feb. 24, 2017.
International Search Report issued in Application No. PCT/JP2014/006290 dated Feb. 10, 2015.

* cited by examiner

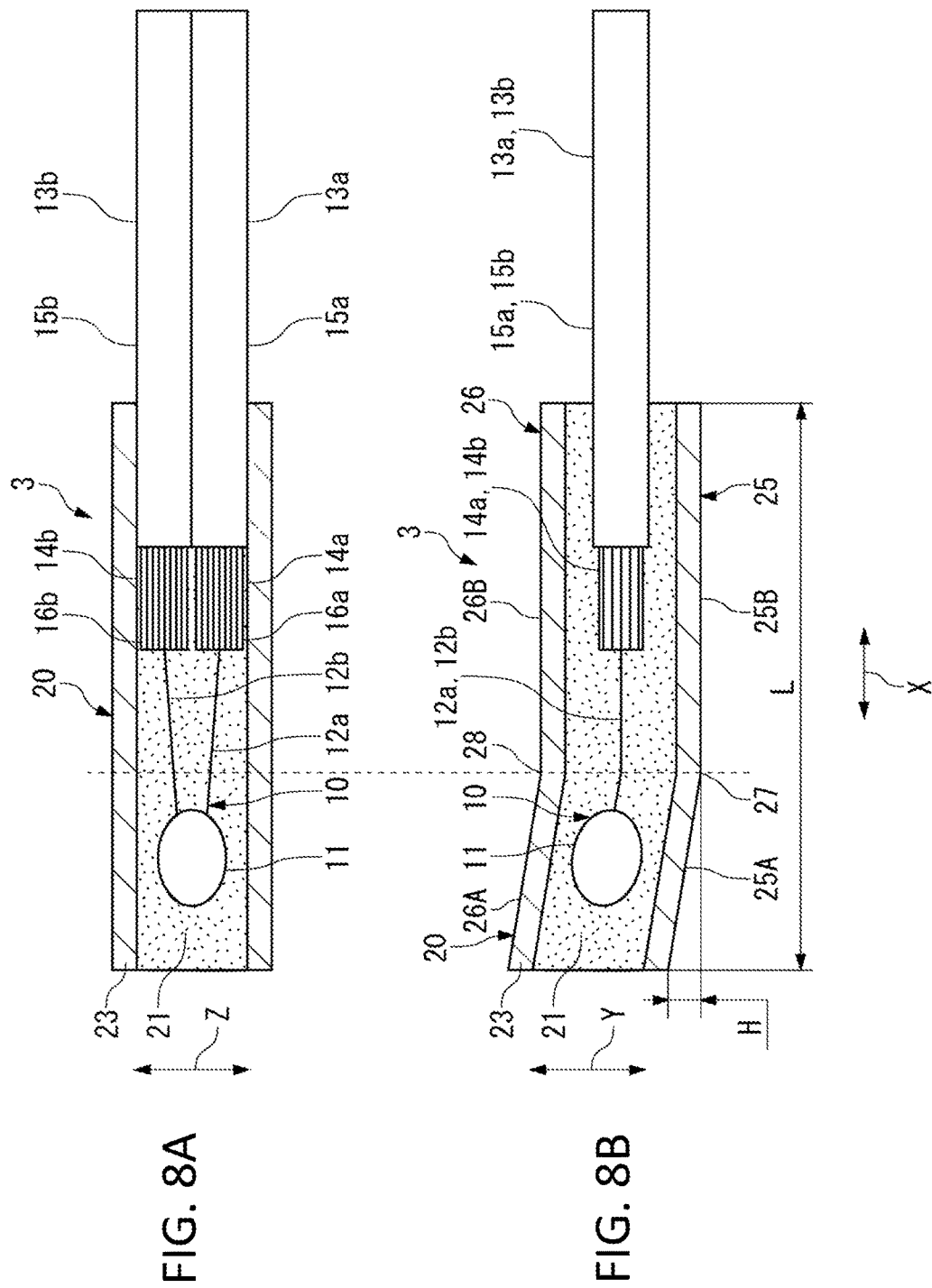

TEMPERATURE SENSOR AND TEMPERATURE SENSOR MANUFACTURING METHOD

TECHNICAL FIELD

The present invention relates to a temperature sensor coated with a resin tube.

BACKGROUND ART

As is well known, a thermistor is often used as an element body that detects temperature in a temperature sensor. As a temperature sensor for applications requiring various kinds of resistance properties such as oil resistance, chemical resistance, heat resistance, and cold resistance with respect to ambient environment in which a temperature detection object is placed, a temperature sensor in which a thermistor is sealed inside a coating layer made of a resin is used. For example, a patent literature 1 proposes a thermistor temperature sensor in which a thermistor element is connected to lead wires. In the proposed thermistor temperature sensor, the thermistor element and connection parts at which the thermistor element is connected to the lead wires are coated with an insulation tube through shrinkage in an insulation manner, and the outer side thereof is elastically coated with a coating tube.

According to the proposition of the patent literature 1, it is possible to manufacture the temperature sensor only by covering, with the insulation tube and the coating tube, the thermistor element and the connection parts at which the thermistor element and the lead wires are connected. This makes it possible to simplify the manufacturing operation of the temperature sensor to reduce manufacturing cost. In addition, a commercially-available tube can be used as the insulation tube and the coating tube, which also makes it possible to reduce manufacturing cost.

CITATION LIST

Patent Literature

Patent Literature 1: Japanese Patent Laid-Open No. 2012-084674

SUMMARY OF INVENTION

Technical Problem

In the temperature sensor proposed by the patent literature 1, a covering cylinder tube is thermally shrunk, but maintains a circular appearance. Therefore, when an object to be subjected to temperature detection is a flat surface, the temperature sensor and the detection object come into line contact with each other. Thus, heat is not sufficiently transferred from the detection object to the temperature sensor. Thus, response of the temperature sensor to temperature change of the detection object is delayed and high temperature detection accuracy is not achieved.

The present invention is based upon such technical problems, and is to provide a temperature sensor that has a resin coating layer and has high temperature detection accuracy.

Solution to Problem

In view of the above circumstances, a temperature sensor according to the present invention includes: a thermistor element in which a pair of lead-out wires are connected to a thermistor; lead wires respectively connected to the pair of lead-out wires; and a resin coating layer covering the thermistor element and connection parts at which the lead-out wires are respectively connected to the lead wires.

The resin coating layer according to the present invention includes an inner layer and an outer layer. The inner layer seals the thermistor element and the connection parts and is made of an inner layer resin material. The outer layer is disposed around the inner layer, and is made of an outer layer resin material that has heat shrinkability and a melting point higher than a melting point of the inner layer resin material. Further, the temperature sensor according to the present invention includes the outer layer having a flat outer surface.

In the temperature sensor according to the present invention, the outer layer of the resin coating layer has the flat outer surface. Therefore, when the detection object has a flat surface, the outer surface is brought into surface contact with the flat surface of the detection object to detect temperature of the detection object. This contributes to accuracy improvement of detected temperature.

Although the detail is described later, in the temperature sensor according to the present invention, it is possible to easily form the flat outer surface, based on the fact that the melting point of the inner layer resin material is lower than that of the outer layer resin material.

In the temperature sensor according to the present invention, the resin coating layer may preferably have a rectangular-parallelepiped appearance.

The temperature sensor has four flat outer surfaces, which allows surface contact with a detection object irrespective of a direction of the temperature sensor. Therefore, installation flexibility of the temperature sensor is high.

In the temperature sensor according to the present invention, a space between the pair of lead-out wires and a space between the pair of lead wires including the connection parts may be preferably filled with the inner layer resin material, inside the inner layer, in order to surely achieve insulation between wires.

In the temperature sensor according to the present invention, the flat outer surface may preferably include a first contact surface and a second contact surface that are inclined to each other in a longitudinal direction, and may preferably form a mountain-folded shape in the longitudinal direction.

When a temperature detected surface of the detection object has a uniformly-extending flat surface and is parallel to the temperature sensor, it is sufficient for the temperature sensor according to the present invention to have the outer surface that is uniformly-extending flat surface. When the temperature detected surface is inclined or twisted, however, it is difficult to obtain a sufficient contact area between the temperature detected surface and the outer surface by the uniformly-extending flat outer surface of the temperature sensor. Thus, in the present invention, the contact surface is formed in the mountain-folded shape as mentioned above, and the contact surface is pressed against the temperature detected surface so as to be deformed to substantially flat. This causes the contact surface to easily follow the temperature detected surface.

Note that, in the present invention, a direction in which the lead-out wires are extended is referred to as the longitudinal direction.

In the temperature sensor according to the present invention, the first contact surface and the second contact surface may be preferably formed to allow a ridgeline serving as a boundary between the first contact surface and the second contact surface, to be located in a region provided with the lead-out wires, in the longitudinal direction.

Heat from the detection object is directly transferred to the thermistor, and is also transferred to the thermistor through the pair of lead-out wires. Therefore, disposing, in the region provided with the lead-out wires, the ridgeline that is preferentially pressed against and comes into close contact with the detection object as compared with the other parts, makes it possible to accelerate thermal conduction to the thermistor through the lead-out wires. In particular, the ridgeline may be preferably disposed in proximity to the thermistor.

In the temperature sensor according to the present invention, a counter surface that is the outer surface opposed to the first contact surface and the second contact surface may be preferably formed in a valley-folded shape in the longitudinal direction.

In the case where the counter surface has the valley-folded shape, the resin coating layer is easily deformed when the temperature sensor is pressed against the detection object. This causes the first contact surface and the second contact surface to easily follow the surface characteristics of the detection object.

In the temperature sensor according to the present invention, the inner layer resin material may be preferably made of PFA, the outer layer resin material may be preferably made of PTFE, and the lead wires may be preferably coated with a coating material made of PTFE.

PFA and PTFE are both high resistance fluorine resin, and PFA has a melting point of 302° C. to 310° C., and PTFE has a melting point of 327° C.

The present invention provides a method of manufacturing the temperature sensor mentioned above at low cost.

The manufacturing method includes: a tube covering step of covering the thermistor element and the connection parts with an inner layer tube made of the inner layer resin material, and covering surroundings of the inner layer tube with an outer layer tube made of the outer layer resin material to form a sensor assembly; a sealing step of heating the inner tube and the outer tube of the sensor assembly to a temperature that is higher than the melting point of the inner layer resin material and lower than the melting point of the outer layer resin material, and sealing the thermistor element and the connection parts with the melted inner layer resin material; and a molding step of molding the flat surface on an outer peripheral surface of the outer layer tube until the melted inner layer resin material is solidified.

In the manufacturing method according to the present invention, a flat surface is formed on the outer peripheral surface of the outer layer tube until the melted inner layer resin material is solidified. Thus, pressure applied to form the flat surface on the outer peripheral surface of the outer layer tube is transferred to the melted inner layer resin material, and a flat surface corresponding to the flat surface of the outer layer tube is accordingly formed in the inner layer resin material. When the inner layer resin material is solidified while maintaining the state, the solidified inner layer resin material is tightly adhered to the outer layer tube, which maintains the flat surface formed on the outer layer tube. Since the outer layer tube is also heated to a temperature close to the melting point in this step, the flat surface is easily formed in the outer peripheral surface.

In the manufacturing method according to the present invention, although the molding step of molding the flat surface is arbitrary, press processing performed with use of a mold that has a flat pressing surface in at least a portion thereof may be preferably employed.

In the manufacturing method according to the present invention, the mountain-folded shape in which the first contact surface and the second contact surface are inclined to each other in the longitudinal direction is obtainable in the above-described molding step. The manufacturing method according to the present invention, however, may preferably further include a forming step of forming the resin coating layer molded in a straight shape in the molding step, into the above-described mountain-folded shape.

The temperature sensor according to the present invention including the mountain-folded contact surface is pressed against the detection object, and the entire contact surface becomes flat in use. Therefore, in the usage state, lower stress occurred in the components of the temperature sensor is advantageous for continuous use of the temperature sensor, and the contact surface may be molded in a straight shape once, and then may be preferably remolded in the mountain-folded shape.

Advantageous Effects of Invention

According to the temperature sensor of the present invention, the outer layer of the resin coating layer has the flat outer surface. Thus, temperature detection is performed while the outer surface is brought into surface contact with a flat surface of the detection object even if the detection target has the flat surface. This contributes to accuracy improvement of the detected temperature.

BRIEF DESCRIPTION OF DRAWINGS

FIG. 1A is a plan view, FIG. 1B is a side view, FIG. 1C is a front view, and FIG. 1D is a cross-sectional view.

FIGS. 8A and 8B are vertical cross-sectional views each illustrating a temperature sensor according to a second embodiment, where FIG. 8A is a plane cross-sectional view, and FIG. 8B is a side cross-sectional view.

DESCRIPTION OF EMBODIMENTS

Figure 1A:
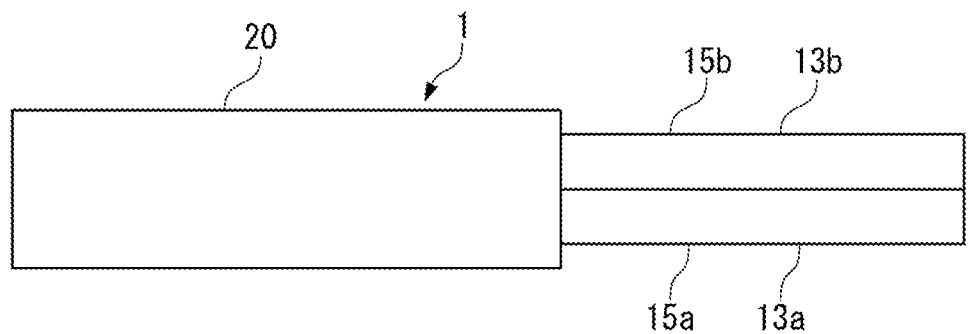
FIGS. 1A to 1D illustrate a temperature sensor according to a first embodiment, where
Figure 1B:
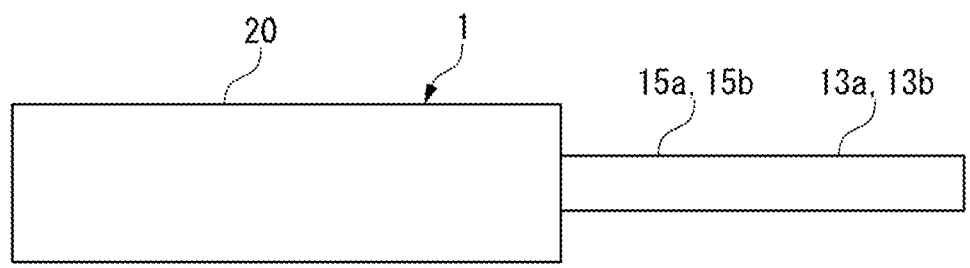
Figure 1C:
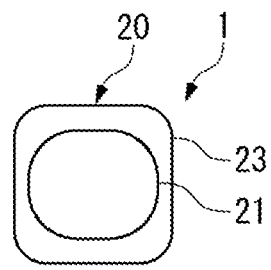
Figure 1D:
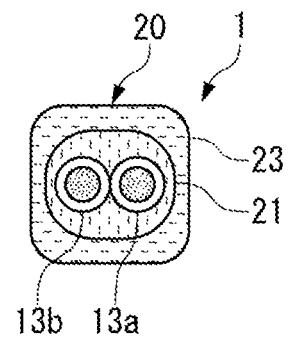
Figure 2:
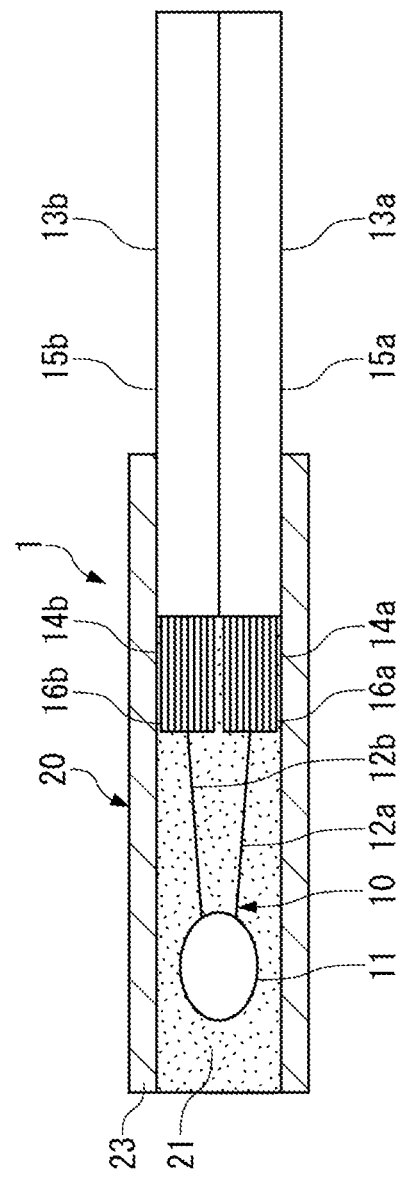
FIG. 2 is a vertical cross-sectional view of the temperature sensor of FIGS. 1A to 1D.

The present invention is described in detail below based on embodiments illustrated in accompanying drawings.

[First Embodiment]

As illustrated in FIGS. 1A to 1D and FIG. 2, a temperature sensor 1 according to a first embodiment includes a thermistor element 10 and a coating layer 20 made of a resin. The temperature sensor 1 that seals the thermistor element 10 with the resin coating layer 20, is suitable for use in environment requiring resistances. Also, in the temperature sensor 1, the resin coating layer 20 has an appearance of a rectangular-parallelepiped shape and has a flat side surface. Thus, the temperature sensor 1 is disposed while the flat surface thereof is brought into surface contact with the detection object having a flat surface. This results in high accuracy of temperature detection. Hereinafter, components of the temperature sensor 1 are described, and manufacturing processes thereof are then described.

[Configuration of Temperature Sensor 1]

[Thermistor Element 10]

The thermistor element 10 includes an element body 11 formed of a thermistor, and a pair of lead-out wires 12a and 12b that are led out from the element body 11.

The element body 11 is configured of a thermistor material having temperature characteristics to electric resistance.

The lead-out wires 12a and 12b that are each formed of, for example, a Dumet wire and led out from the element body 11 are respectively connected to lead wires 13a and 13b. The lead-out wires 12a and 12b are connected to the element body 11 through electrodes not illustrated. The lead wires 13a and 13b are connected to a temperature measurement circuit not illustrated through another electric wires as necessary. The lead-out wires 12a and 12b are formed of a single conductive wire. The lead wires 13a and 13b are respectively formed of twisted wires 14a and 14b and coatings 15a and 15b. The twisted wires 14a and 14b are each formed by twisting a fine conductive wire, and are respectively coated with the coatings 15a and 15b. The coatings 15a and 15b may be made of a fluorine resin such as polytetrafluoroethylene (PTFE), and have a melting point equivalent to that of an outer layer 23 described later, in order to prevent the coatings 15a and 15b from being melted in heating process described later.

The lead-out wires 12a and 12b are respectively connected to the lead wires 13a and 13b by welding such as laser welding and resistance welding, or soldering, at connection parts 16a and 16b. A crimp terminal may be used to connect the lead-out wires 12a and 12b to the lead wires 13a and 13b, respectively.

The thermistor element 10 may allow a predetermined current to flow through the element body 11 through one of lead wires 13, and may detect temperature of an object, based on change of a resistance value of a measurement path communicated with the other lead wire 13.

[Coating Layer 20]

The coating layer 20 covers from a tip end of the element body 11 up to the connection parts 16a and 16b at which the lead-out wires 12a and 12b are respectively connected to the lead wires 13a and 13b, and protects the element body 11 and others from ambient environment.

The coating layer 20 has an inner layer 21 and the outer layer 23. The inner layer 21 and the outer layer 23 originally have a circular outer shape because a tube is used for a precursor thereof; however, the coating layer 20 has a substantially rectangular cross-section because being subjected to press processing using a mold that has a rectangular-parallelepiped cavity in the manufacturing process of the temperature sensor 1. The rectangular cross-section and flat side surface are features of the coating layer 20.

The inner layer 21 is disposed inside the outer layer 23, and directly covers the thermistor element 10. The inner layer 21 is formed by the tubular precursor that is melted and solidified in the manufacturing process, thereby tightly sealing the inside parts from the tip end of the element body 11 up to the connection parts 16a and 16b. In particular, the inner layer 21 fills a space between the lead-out wire 12a and the lead-out wire 12b and a space between the lead wire 13a and the lead wire 13b without a gap, at the connection parts 16a and 16b and in the vicinity thereof. This is because the coating layer 20 is processed through the press processing. In addition, the inner layer 21 formed through melting once and solidification has an important role to form the coating layer 20 having a rectangular cross-section. This is described in description of manufacturing processes.

The inner layer 21 is a fluorine resin made of tetrafluoroethylene-perfluoroalkyl vinyl ether copolymer (PFA). PTFE and PFA are both fluorine resins and have excellent resistances, but PTFE has a higher melting point than PFA.

Then, the outer layer 23 is disposed in close contact with outer side of the inner layer 21.

The outer layer 23 provides, together with the inner layer 21, resistances to the temperature sensor 1, and plays a role in retaining the inner layer 21 that is melted in the manufacturing processes. Therefore, the outer layer 23 is made of PTFE having a higher melting point than PFA that forms the inner layer 21. More specifically, the melting point of PFA is 302° C. to 310° C., whereas the melting point of PTFE is 327° C. Therefore, for example, if being heated to 315° C., the precursor tube of the inner layer 21 is melted but the precursor tube of the outer layer 23 is not melted and maintains its shape. The precursor tube of the outer layer 23, however, shrinks if being heated to the temperature. PTFE has a linear expansion coefficient of about $10 \times 10^{-5}/°$ C. that is larger than that of a metal material, and strongly compresses the melted inner layer 21. Therefore, PTFE contributes to densification of the inner layer 21, and waterproof property between the inner layer 21 and the outer layer 23 is secured by pressure occurred therebetween.

[Procedure of Manufacturing Temperature Sensor 1]

Next, a procedure of manufacturing the temperature sensor 1 is described with reference to FIGS. 3A to 3C and FIGS. 4A to 4C.

Figure 3A:
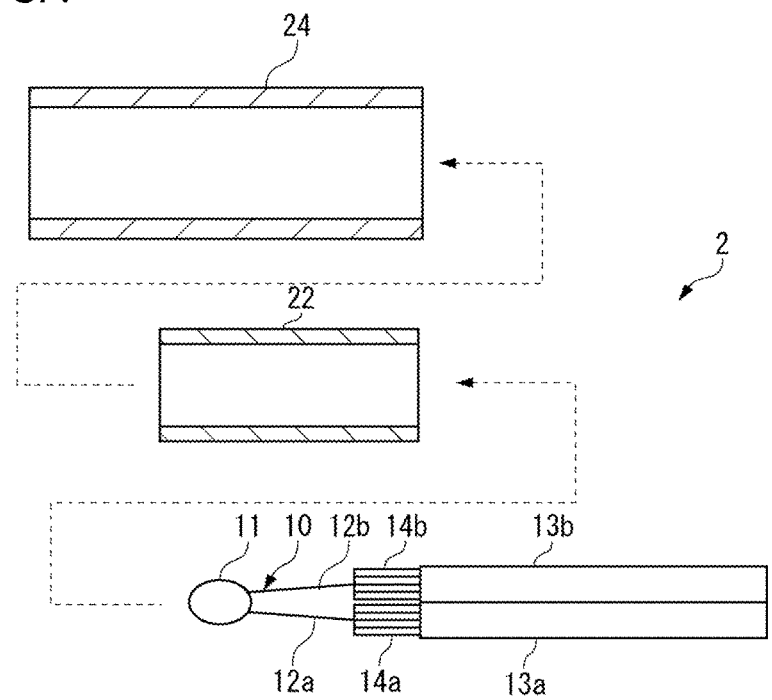
FIGS. 3A to 3C are diagrams each illustrating an outline of a procedure of manufacturing the temperature sensor of FIGS. 1A to 1D.

Before the temperature sensor 1 is manufactured, the thermistor element 10, a precursor tube 22 corresponding to the inner layer 21, and a precursor tube 24 corresponding to the outer layer 23 are prepared as illustrated in FIG. 3A. The precursor tube 22 is made of PFA, and the precursor tube 24 is made of PTFE. The precursor tube 22 has an inner diameter enough to house the thermistor element 10, and the precursor tube 24 has an inner diameter enough to house the precursor tube 22. The inner diameter of the precursor tube 22 is set so as to tightly seal the thermistor element 10 after melting and solidification. The inner diameter of the precursor tube 22 is set so as to allow compression force by thermal shrinkage to be applied to the melted precursor tube 22. Also, a length of the precursor tube 22 is set so as to prevent the melted precursor tube 22 from being leaked from openings at both ends.

As illustrated in FIG. 3A, the thermistor element 10 is housed inside the precursor tube 22, and the precursor tube 22 in which the thermistor element 10 has been housed is housed inside the precursor tube 24. At this time, the precursor tube 22 is placed such that a part from the thermistor element 10 up to the connection parts 16a and 16b is covered with the precursor tube 22. Also, the precursor tube 24 is placed such that the entire precursor tube 22 is covered with the precursor tube 24, to form a sensor assembly 2.

Next, a part, of the sensor assembly, corresponding to the coating layer 20 is heated.

Figure 3B:
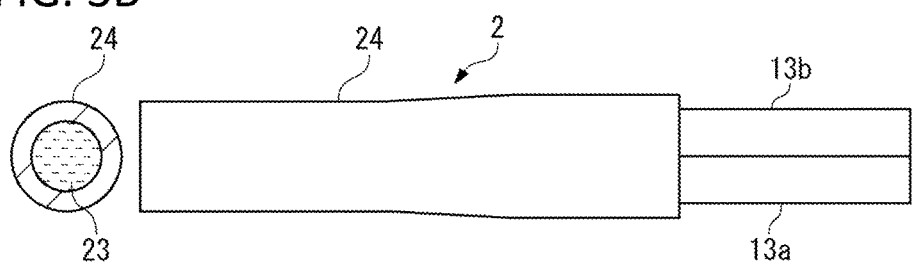

Heating is performed at a temperature that is equal to or higher than a melting point $MP_1$ of PFA forming the precursor tube 22 and lower than a melting point $MP_2$ of PTFE forming the precursor tube 24. Note that the melting point $MP_1$ is 302° C. to 310° C., and the melting point $MP_2$ is 327° C. The precursor tube 22 is melted and the precursor tube 24 thermally shrinks by the heat processing. At this stage, the tip end of the precursor tube 24 becomes thin, but maintains circular appearance, as illustrated in FIG. 3B.

Figure 3C:
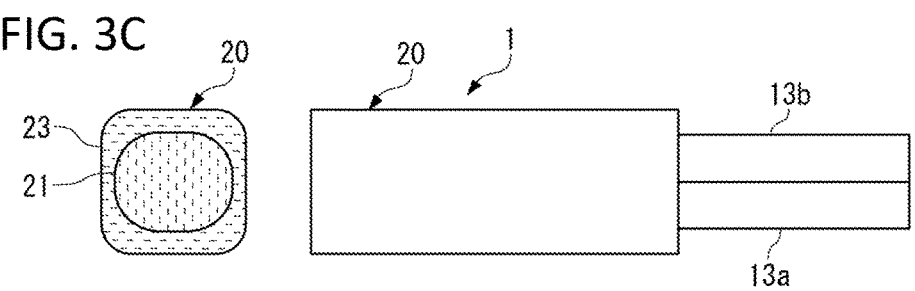

Next, press processing is performed on the part, of the sensor assembly, corresponding to the coating layer 20 while the precursor tube 22 is melted. This results in the rectangular-parallelepiped coating layer 20 as illustrated in FIG. 3C, and the melted precursor tube 22 is solidified during the press processing.

Figure 4A:
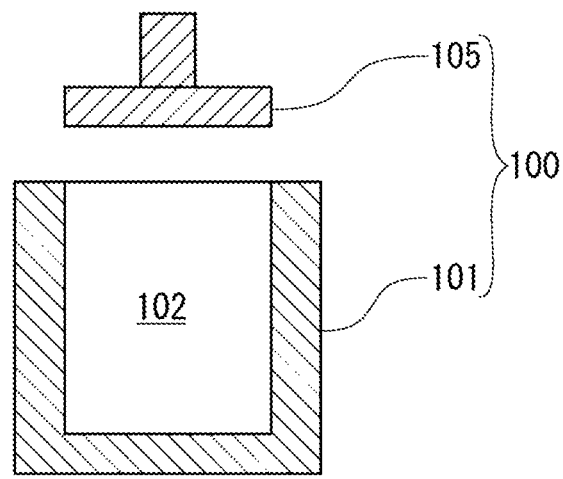
FIGS. 4A to 4C are cross-sectional views illustrating a procedure of press processing in the procedure of manufacturing the temperature sensor of FIGS. 1A to 1D.
Figure 4B:
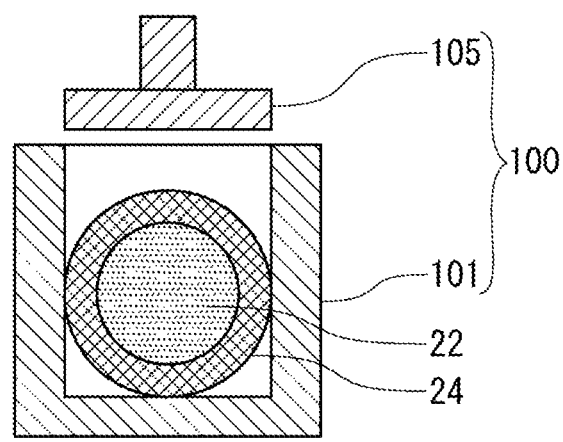
Figure 4C:
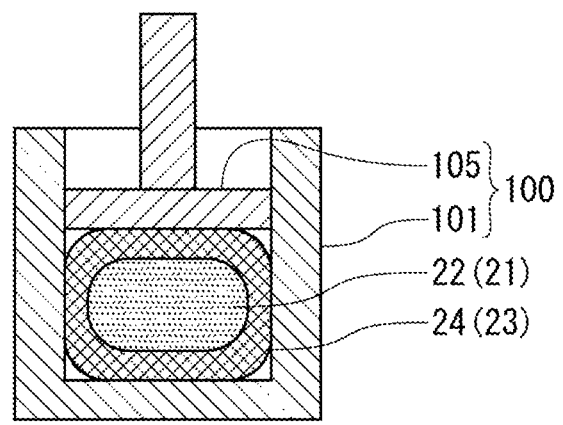

As illustrated in FIG. 4A, the press processing may be performed with use of a mold 100 that has a lower mold 101 and an upper mold 105. The lower mold 101 has a rectangular cavity 102 and a flat pressing surface, and the upper mold 105 has a flat pressing surface that is matched to an opening area of the cavity 102. In other words, the part of the sensor assembly 2 that is heated to the predetermined temperature and corresponds to the coating layer 20 is put into the cavity 102 as illustrated in FIG. 4B, and then the upper mold 105 is inserted into the cavity 102 and pressure is applied thereto to mold the coating layer 20 into a rectangular-parallelepiped shape as illustrated in FIG. 4C.

At the process of pressing, the cross-sections of the precursor tube 22 and the precursor tube 24 are both molded from the circular shape into the rectangular shape; however, the melted precursor tube 22 is solidified while retaining the rectangular shape. Since the precursor tube 24 is heated to temperature close to the melting point $MP_2$, the rectangular cross-section thereof is retained to some extent after the press processing. Further, the rectangular cross-section of the precursor tube 24 is more easily retained through melting and solidification of the precursor tube 22. More specifically, at the time when the melted precursor tube 22 is solidified, the precursor tube 24 that is disposed outside the precursor tube 22 is bonded to the precursor tube 22. Thus, the precursor tube 24 is prevented from returning the original circular cross-section by the precursor tube 22 having the rectangular cross-section. This allows the precursor tube 24 to easily retain the rectangular cross-section, after the press processing.

The press processing contributes to allow the inner layer 21 to fill, without a gap, the space between the lead-out wire 12a and the lead-out wire 12b and the space between the lead wire 13a and the lead wire 13b, near the connection parts 16a and 16b and in the vicinity thereof, in addition to formation of rectangular-parallelepiped coating layer 20. In other words, the precursor tube 24 thermally shrunk by heating makes it possible to supply the melted precursor tube 22 to the spaces, and adding the press processing accelerates the supply. It is confirmed from the study by the present inventors that performing the press processing secures insulation of sufficient level in scale of industrial production, whereas it is difficult to secure insulation near the connection parts 16a and 16b and in the vicinity thereof only with supply through heat shrinkage.

[Effects of Temperature Sensor 1]

Figure 5A:
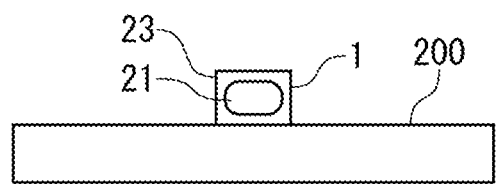
FIGS. 5A to 5C are diagrams illustrating a state in which any of the temperature sensor of FIGS. 1A to 1D and modifications thereof is disposed on a detection object.

The temperature sensor 1 has four flat outer surfaces because of the rectangular-parallelepiped coating layer 20. Therefore, as illustrated in FIG. 5A, the temperature sensor 1 comes into surface contact with the temperature detection object 200 having a flat surface, thereby being increased in sensitivity with respect to temperature change of the temperature detection object 200. This contributes to accuracy improvement of the detection temperature.

Also, the temperature sensor 1 may secure insulation of the connection parts 16a and 16b and the vicinity thereof only by the resin forming the inner layer 21. Thus, it is unnecessary to cover the corresponding parts with a particular insulation material, which allows cost reduction by that amount. If the positions of the connection parts 16a and 16b are shifted from each other in a longitudinal direction, it is unnecessary to cover the connection parts 16a and 16b with the insulation material; however, the size of the temperature sensor 1 is increased by the shifted amount. In contrast, in the temperature sensor 1, even if the positions of the connection parts 16a and 16b are coincident with each other in the longitudinal direction, it is unnecessary to cover the connection parts 16a and 16b with the particular insulation material. This contributes to downsizing of the temperature sensor 1 in addition to cost reduction.

Figure 7:
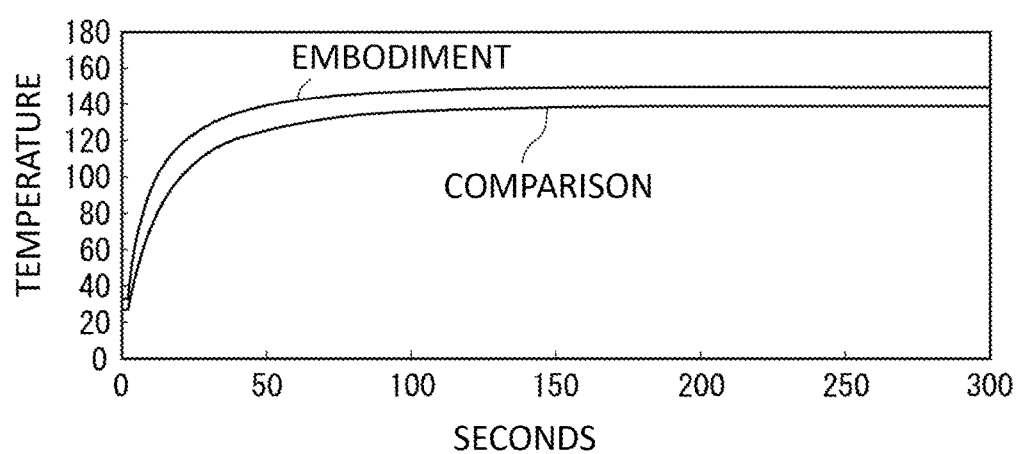
FIG. 7 is a graph illustrating examination results of temperature measurement that is performed with use of the temperature sensor according to the first embodiment and a comparison sensor.

Temperature measurement to confirm the effects was performed with use of the temperature sensor 1 fabricated according to the present embodiment. FIG. 7 illustrates the results. Temperature measurement was also performed similarly with use of a temperature sensor (a comparison sensor) that was similar to the temperature sensor 1 according to the present embodiment except that the comparison sensor was not subjected to the press processing. FIG. 7 also illustrates the results. It was confirmed that the measured temperature of the temperature sensor 1 according to the present embodiment after five minutes (300 seconds) elapsed was higher by about 10° C. than that of the comparison sensor. In comparison of a thermal time constant (63.2% response), the thermal time constant of the temperature sensor 1 was about 24 seconds, whereas the thermal time constant of the comparison sensor was about 43 seconds.

Note that the measurement was performed under the condition that the temperature sensor 1 and the comparison sensor each continuously measured the temperature of a metal block heated to 180° C. while being pressed against the metal block by respective predetermined load, at room temperature.

Although the preferred first embodiment of the present invention has been described above, the configuration described in the above-described first embodiment may be selected or appropriately modified to other configurations without departing from the scope of the present invention.

[Modification of Shape]

Figure 5B:
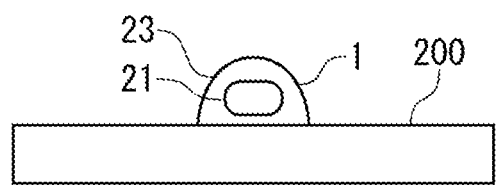
Figure 5C:
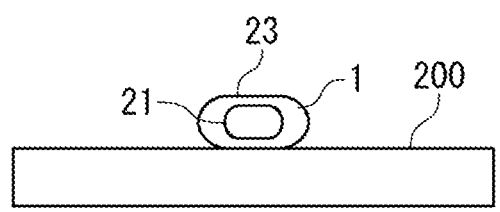

For example, the coating layer 20 of the temperature sensor 1 has a rectangular-parallelepiped shape, and has four flat outer surface. However, accuracy improvement of the detection temperature through contact of surfaces is achievable when the coating layer 20 has at least one flat outer surface. Therefore, the present invention encompasses the coating layer 20 having one flat outer surface as illustrated in FIG. 5B, and the coating layer 20 having two flat outer surfaces that are opposite to each other as illustrated in FIG. 5C.

Figure 6A:
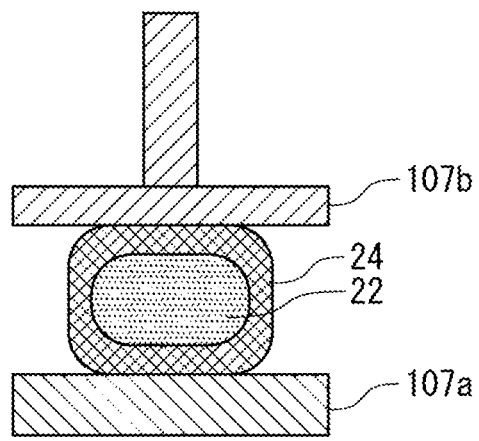
FIGS. 6A and 6B are diagrams illustrating other methods of forming a flat outer surface on a coating layer.
Figure 6B:
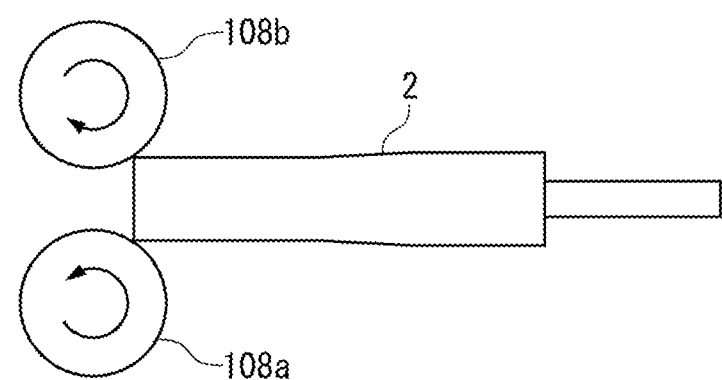

Also, the process of forming a flat outer surface is arbitrary, and for example, as illustrated in FIG. 6A, a lower mold 107a and an upper mold 107b each having a flat surface may be used to form the coating layer 20 having two flat outer surfaces. Further, as illustrated in FIG. 6B, allowing the corresponding part of the sensor assembly 2 to pass through a space between a pair of rolls 108a and 108b makes it possible to form the coating layer 20 having two flat outer surfaces. As illustrated in FIGS. 4A to 4C, using the press processing that presses the corresponding part of the sensor assembly 2 from four side surfaces is preferable in order to allow the resin forming the inner layer 21 to enter the space between the lead-out wire 12a and the lead-out wire 12b and the space between the lead wire 13a and the lead wire 13b without a gap. In other words, forming the coating layer 20 in a rectangular shape is effective to allow the resin to enter the spaces without a gap, as a result.

[Second Embodiment]

Next, a temperature sensor 3 according to a second embodiment of the present invention is described.

The second embodiment proposes the temperature sensor 3 that makes it possible to secure sensitivity with respect to temperature change of the temperature detection object 200, for example, even in a case where the temperature detection object 200 is inclined to the temperature sensor 3, or even in a case where a temperature detected surface of the temperature detection object 200 is not flat.

As illustrated in FIGS. 8A and 8B, the temperature sensor 3 includes the thermistor element 10 and the coating layer 20 made of a resin. The thermistor element 10 includes the element body 11 formed of a thermistor, and the pair of lead-out wires 12a and 12b that are led out from the element body 11. The coating layer 20 has the inner layer 21 and the outer layer 23. Since the temperature sensor 3 has the basic configuration same as that of the temperature sensor 1, differences with the temperature sensor 1 are mainly described, and the same reference signs used in the first embodiment are used for the components same as those of the temperature sensor 1 in the drawings referred below.

The temperature sensor 3 is different in appearance shape of the coating layer 20 from the temperature sensor 1 according to the first embodiment. More specifically, the coating layer 20 of the temperature sensor 1 is extended straightly in an axis direction, whereas the coating layer 20 of the temperature sensor 3 has a first contact surface 25A and a second contact surface 25B and a first counter surface 26A and a second counter surface 26B that are mutually inclined in the longitudinal direction X (FIG. 8B). Since the first contact surface 25A and the second contact surface 25B are inclined from each other in this way, an outer surface 25 forms a mountain-folded shape, and an outer surface 26 opposed to the outer surface 25 forms a valley-folded shape, in the longitudinal direction X. A ridgeline 27 is formed at a boundary between the first contact surface 25A and the second contact surface 25B of the outer surface 25. Also, a trough line 28 is formed at a boundary between the first counter surface 26A and the second counter surface 26B of the outer surface 26. The outer surface 25 is segmented, with the ridgeline 27 as a boundary, into the first flat contact surface 25A and the second flat contact surface 25B. The outer surface 26 is segmented, with the trough line 28 as a boundary, into the first flat counter surface 26A and the second flat counter surface 26B. The ridgeline 27 and the trough line 28 are each extended over the region in a width direction Z (FIG. 8A) that is orthogonal to the longitudinal direction X. The ridgeline 27 is provided at a position slightly displaced toward the rear end from the connection parts at which the element body 11 and the lead-out wires 12a and 12b are connected to each other. The same applies to the trough line 28. Note that, in the temperature sensor 3, the direction in which two lead wires 13a and 13b are arranged is referred to as the width direction Z, and the direction orthogonal to the width direction Z is referred to as a height direction Y (FIG. 8B). Also, in the temperature sensor 3, side provided with the element body 11 is referred to as front, and side from which the lead wires 13a and 13b are led out is referred to as rear. Note that the first contact surface 25A and the second contact surface 25B are each formed of a flat surface in this example; however, the both surfaces may be replaced with an incorporative arc surface having a small curvature. Also in the case where the mountain-folded shape is configured of the arc surface, operations and effects described below are exerted.

Next, operations and effects exerted when the first contact surface 25A and the second contact surface 25B of the outer surface 25 of the temperature sensor 3 form the mountain-folded shape are described with reference to FIGS. 9A to 9C and FIGS. 10A to 10C.

First, a contact state of the temperature sensor 1 according to the first embodiment to the temperature detection object 200 is described with reference to FIGS. 9A to 9C. The contact state depends on the temperature detection object 200.

Figure 9A:
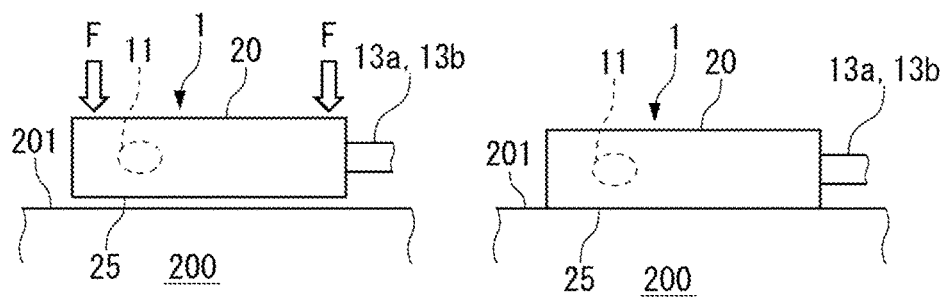
FIGS. 9A to 9C are diagrams for explaining problems of the temperature sensor according to the first embodiment.

FIG. 9A illustrates a case where a temperature detected surface 201 of the temperature detection object 200 is a uniformly-extending flat surface, and is parallel to the outer surface (the contact surface) 25 of the temperature sensor 1 (left side in FIG. 9A). In this case, as described in the first embodiment, the outer surface 25 may be brought into surface contact with the temperature detected surface 201 (right side in FIG. 9A). Note that, in FIGS. 9A to 9C and FIGS. 10A to 10C, the temperature sensors 1 and 3 are assumed to be pressed against the temperature detection object 200 at a load F illustrated by an outline arrow.

Figure 9B:
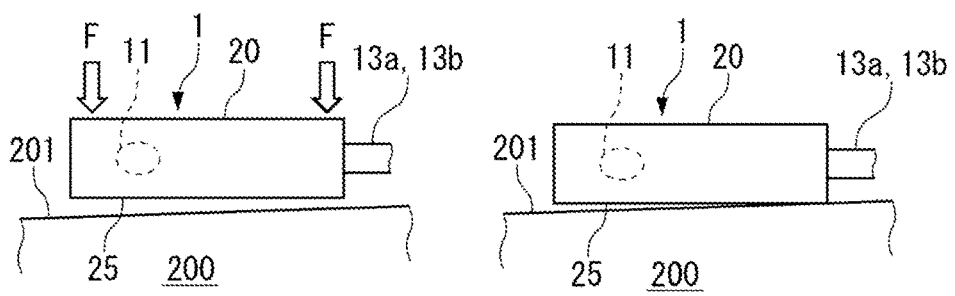

As illustrated in FIG. 9B, if the temperature detected surface 201 is inclined to the outer surface 25 (left side in FIG. 9B), the surface contact is not performed and the outer surface 25 comes into line contact with the temperature detected surface 201 at the rear end (right side in FIG. 9B), as long as the temperature sensor 1 is not inclined. Further, in the case where the temperature detected surface 201 is inclined as illustrated in FIG. 9B, the outer surface 25 comes into line contact with the temperature detected surface 201 at the rear end of the lead-out side of the lead wires 13a and 13b that is farthest from the element body 11. This deteriorates sensitivity of the element body 11 with respect to the temperature change of the temperature detection object 200.

Figure 9C:
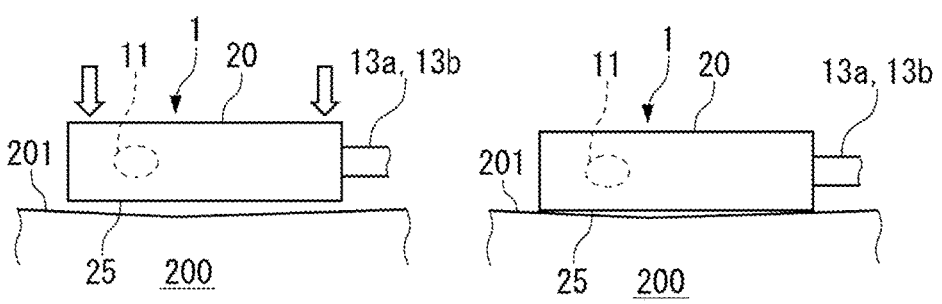

Also, as illustrated in FIG. 9C, if the temperature detected surface 201 is recessed (left side in FIG. 9C), the outer surface 25 comes into line contact with the temperature detected surface 201 only at the front end and the rear end thereof (right side in FIG. 9C).

As described above, in the case where the outer surface 25 is formed of one uniformly-extending flat surface as with the temperature sensor 1, the sensitivity of the element body 11 with respect to the temperature change of the temperature detection object 200 may be impaired depending on the characteristics of the temperature detected surface 201. To solve the above-described difficulties, the outer surface 25 of the temperature sensor 3 is formed of the first contact surface 25A and the second contact surface 25B that form a mountain shape. The operations and effects thereof are described below with reference to FIGS. 10A to 10C. Note that the characteristics of the temperature detected surface 201 in each of FIGS. 10A, 10B, and 10C are coincident with those of FIGS. 9A, 9B, and 9C, respectively.

Figure 10A:
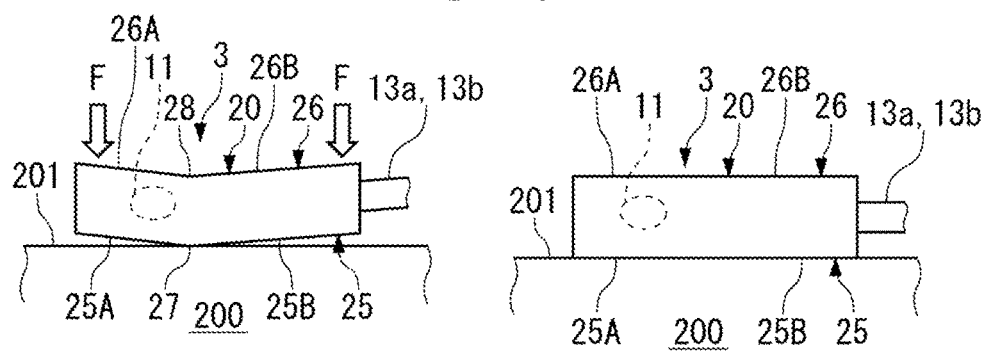
FIGS. 10A to 10C are diagrams for explaining effects of the temperature sensor according to the second embodiment, corresponding to FIGS. 9A to 9C.
Figure 10B:
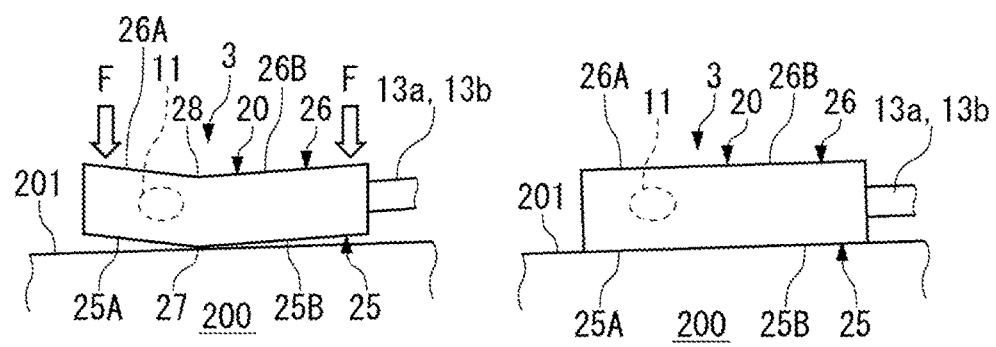
Figure 10C:
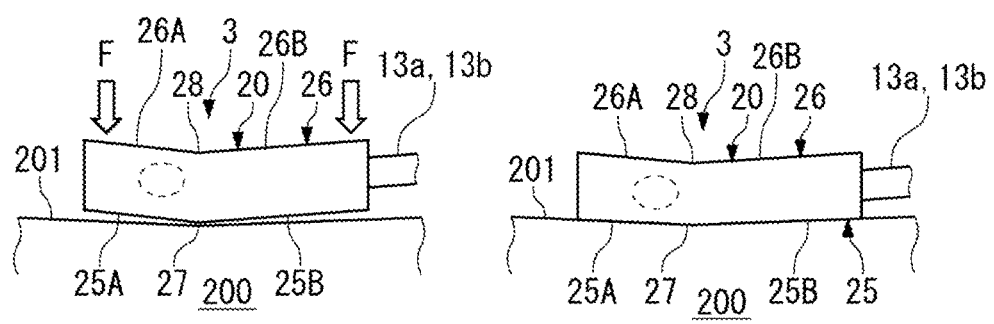

In FIG. 10A, the temperature detected surface 201 of the temperature detection object 200 is horizontal (left side in FIG. 10A), and in this case, the ridgeline 27 of the temperature sensor 3 merely comes into line contact with the temperature detected surface 201 when load is not applied. When the load F is applied to the front end and the rear end of the coating layer 20 to press the temperature sensor 3 against the temperature detected surface 201, the mountain-folded outer surface 25 is deformed to a uniformly-extending flat surface following the temperature detected surface 201, and comes into surface contact with the temperature detected surface 201. At this time, the ridgeline 27 comes into close contact with the temperature detected surface 201 as compared with the first contact surface 25A and the second contact surface 25B that sandwich the ridgeline 27.

Therefore, it is possible to obtain sensitivity with respect to the temperature change equivalent to or greater than that of the surface contact illustrated in FIG. 9A.

Since the outer surface 26 of the temperature sensor 3 forms a valley-folded shape in this case, the coating layer 20 may be deformed straightly when the load F is applied to two points, the front end and the rear end of the coating layer 20. This means that it is sufficient for the member holding the coating layer 20 to hold the coating layer 20 at least the two points.

Further, as illustrated in FIG. 10B, even in a case where the temperature detected surface 201 is inclined to horizon (left side in FIG. 10B), deforming the mountain-folded outer surface 25 to a uniformly-extending flat surface following the temperature detected surface 201 makes it possible to bring the outer surface 25 into surface contact with the temperature detected surface 201 (right side in FIG. 10B).

Furthermore, as illustrated in FIG. 10C, even in a case where the temperature detected surface 201 is recessed (left side in FIG. 10C), deforming the mountain-folded outer surface 25 to a uniformly-extending flat surface following the temperature detected surface 201 makes it possible to bring the outer surface 25 into surface contact with the temperature detected surface 201 (right side in FIG. 10C).

As described above, the temperature sensor 3 makes it possible to secure contact surface with the temperature detected surface 201 irrespective of the various characteristics of the temperature detected surface 201.

Although the case where the entire region of the outer surface 25 (the first contact surface 25A and the second contact surface 25B) comes into surface contact with the temperature detected surface 201 is exemplified, there may be a case where only partial surface contact is performed therebetween, depending on the characteristics of the temperature detected surface 201. However, it is apparent from the above description with reference to FIGS. 10A to 10C that forming the contact surface in the mountain-folded shape allows the contact surface to follow the shape of the temperature detected surface 201, which makes it easier to perform surface contact, as compared with a case where the outer surface 25 is formed only of a uniformly-extending flat surface.

Further, the present inventors find that the sensitivity with respect to the temperature change varies depending on the position even if the outer surface 25 merely comes into line contact with the temperature detected surface 201.

As illustrated in FIG. 8B, in the temperature sensor 3, the ridgeline 27 is provided at a position slightly displaced toward the rear end from the connection parts where the element body 11 and the lead-out wires 12a and 12b are connected to each other. In other words, when the ridgeline 27 comes into contact with the temperature detected surface 201 (left side in FIG. 10A), a distance between the contact position and the element body 11 is short, which results in high sensitivity with respect to the temperature change of the temperature detection object 200. In this case, the sensitivity with respect to the temperature change is influenced by not only heat that the element body 11 directly receives but also heat that the element body 11 receives through the lead-out wires 12a and 12b, in a manner, indirectly. In particular, the lead-out wires 12a and 12b are each made of a metal material such as a Dumet wire that is high in thermal conductivity. This allows the lead-out wires 12a and 12b to rapidly transfer, to the element body 11, heat received from the temperature detected surface 201 mainly through the ridgeline 27. Further, since the ridgeline 27 comes into closest contact with the temperature detected surface 201, the heat from the temperature detected surface 201 is surely transferred to the ridgeline 27 as compared with the other parts. This accelerates heat transfer to the element body 11 through the lead-out wires 12a and 12b.

The effects including those described above of the temperature sensor 3 are summarized as follows.

The temperature sensor 3 has a mountain-folded outer surface 25 that comes into contact with the temperature detected surface 201, which makes it easy to perform surface contact with the temperature detected surface 201. Therefore, it is possible to ensure high sensitivity with respect to the temperature change of the temperature detection object 200.

The mountain-folded shape is provided at an arbitrary position in the longitudinal direction X. Providing the ridgeline 27 at the same position in a plurality of temperature sensors 3 makes it possible to suppress fluctuation of measured temperature results among the temperature sensors 3.

Also, since the ridgeline 27 of the temperature sensor 3 is provided at a position displaced toward the rear end from the connection parts where the element body 11 and the lead-out wires 12a and 12b are connected to each other, the temperature sensor 3 receives heat that is indirectly transferred through the lead-out wires 12a and 12b, in addition to heat that is directly received by the element body 11. Accordingly, the temperature sensor 3 is high in sensitivity with respect to the temperature change of the temperature detection object 200.

In the temperature sensor 3, a percentage (%) of an amount of warpage H at a front end of a second part 20B with respect to a size L of the coating layer 20 in the longitudinal direction may be 0.5% or higher, more preferably 1% or higher, which sufficiently exerts the effects of the temperature sensor 3. In contrast, if the amount of warpage is larger than necessary, the size of the temperature sensor 3 in the height direction Y is accordingly increased, which is disadvantageous in a case where the temperature sensor 3 is used at a narrow area. As an indication taking into consideration the disadvantage, the percentage (%) of the amount of warpage H with respect to the size L is equal to or lower than 5%.

[Method of Manufacturing Temperature Sensor 3 (Forming)]

Next, a method of manufacturing the temperature sensor 3 is described with reference to FIGS. 11A to 11D. Note that an example is described below in which the press processing is performed on the temperature sensor 1 having the straight coating layer 20 to form (perform 'forming' of) the temperature sensor 3.

Figure 11A:
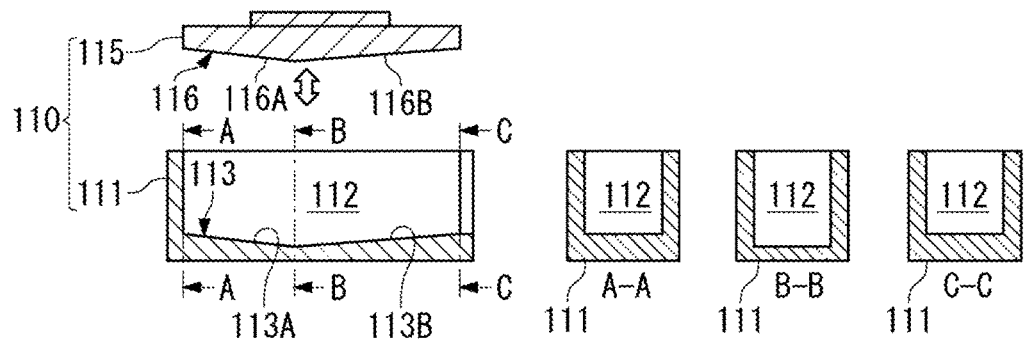
FIGS. 11A to 11D are diagrams each illustrating a main part of a procedure of manufacturing the temperature sensor of FIGS. 9A to 9C.

FIG. 11A illustrates an outline configuration of a mold 110 used in forming process that is performed to form the temperature sensor 3.

The mold 110 includes a lower mold 111 having a substantially rectangular cavity 112, and an upper mold 115 having a pressing surface 116 that is matched to an opening area of the cavity 112. The mold 110 has the configuration same as that of the mold 100 used for formation of the temperature sensor 1 except for the following points.

In the lower mold 111, a lower formation surface 113 facing the cavity 112 includes a first formation surface 113A and a second formation surface 113B that respectively correspond to the first contact surface 25A and the second contact surface 25B of the temperature sensor 3.

Also, the pressing surface 116 of the upper mold 115 includes a first formation surface 116A and a second formation surface 116B that respectively correspond to the first counter surface 26A and the second counter surface 26B of the outer surface 26 of the temperature sensor 3.

Figure 11B:
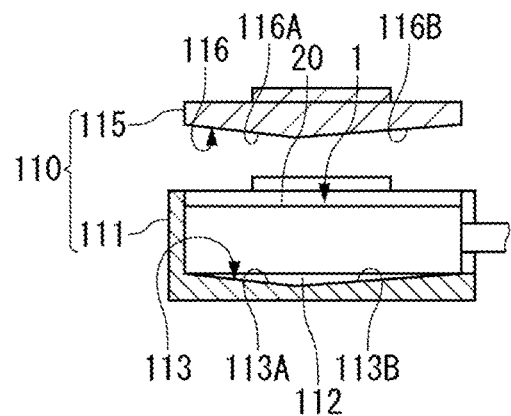
Figure 11C:
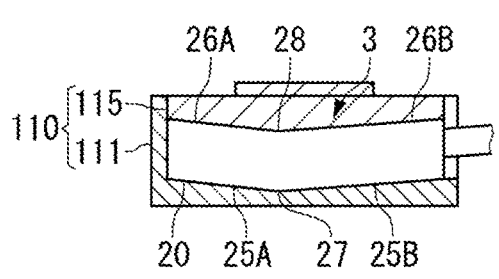
Figure 11D:
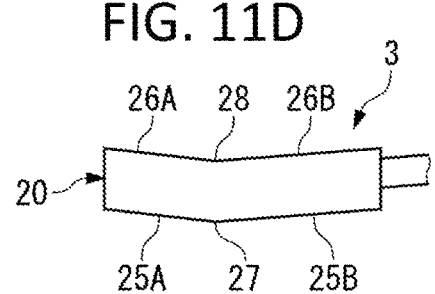

In the forming process, the temperature sensor 1 is heated to the predetermined temperature, and the heated temperature sensor 1 is then put in the cavity 112 of the lower mold 111, as illustrated in FIG. 11B. Subsequently, as illustrated in FIG. 11C, the upper mold 115 is inserted into the cavity 112 and pressure is applied thereto, thereby molding the straight coating layer 20 into a shape consist of a first part 20A and the second part 20B that are inclined to each other at a predetermined angle. The pressure is continuously applied for a predetermined length of time until the molded shape is retained, and then the molded temperature sensor 3 is taken out from the cavity 112 (FIG. 11D).

Since it is sufficient for the forming process to deform the coating layer 20, the heating is performed at a temperature lower than the temperature in formation of the temperature sensor 1. More specifically, heating temperature lower than the melting point $MP_1$ at which PFA forming the precursor tube 22 is softened to deformable level may be employed.

As mentioned above, the forming process is performed on the temperature sensor 1 in order to form the temperature sensor 3. Alternatively, the mold 110 may be used in place of the mold 100 for formation of the temperature sensor 1, which directly forms the mountain-folded temperature sensor 3.

However, preferably the temperature sensor 1 having the straight coating layer 20 may be molded once, and then the forming process may be applied to the temperature sensor 1 to remold the coating layer 20 in the mountain-folded shape. This is because, as described with reference to FIGS. 10A to 10C, the coating layer 20 of the temperature sensor 3 may be deformed straightly, and the straight state of the coating layer 20 may be continued in the usage state. Stress occurred in the components of the temperature sensor 3 may be preferably small during the continuous usage in order to maintain soundness of each component. Therefore, when the coating layer is molded in the straight shape once and then remolded in the mountain-folded shape, the shape in the usage state is coincident with or approximately to the straight state before the remolding to the mountain-folded shape. This makes it possible to suppress stress occurred in the usage state. In contrast, if the coating layer 20 is formed in the mountain-folded shape from the beginning, the stress occurred in the usage state in which the coating layer 20 becomes straight becomes high. This is described below by taking an example of the lead-out wires 12a and 12b.

In the temperature sensor 1 having the straight coating layer 20, the lead-out wires 12a and 12b straightly extend, and therefore bending stress does not occur on the lead-out wires 12a and 12b at this time. However, the lead-out wires 12a and 12b are bent (FIG. 8B) through the forming process. Thus, bending stress occurs on the lead-out wires 12a and 12b. Then, when the coating layer 20 becomes straight in the usage state, the bending stress is released because the lead-out wires 12a and 12b are released from the bent state and become straight.

As mentioned above, the forming process is performed mainly in order to form the first contact surface 25A and the second contact surface 25B in the mountain-folded shape. In a case where the temperature sensor 1 is varied in shape accuracy, the forming process also has a function of correcting the variation. In other words, the temperature sensor 1 is assumed to have the outer surface 25 formed of a flat surface; however, the outer surface 25 may actually have fine irregularities or a twisted part. Therefore, when a large number of temperature sensors 1 is fabricated, the characteristics of the outer surface 25 may be varied among individual temperature sensors 1. Therefore, performing the forming process on the temperature sensor 1 to form the outer surface 25 in the mountain-folded shape without exception makes it possible to reduce variation of the characteristics, and to accordingly reduce variation of temperature measured by the temperature sensor 3.

To confirm the effects, the present inventors performed temperature measurement of 20 temperature sensors 1 (before forming process) and temperature sensors 3 (after forming process) with use of a heat source of 100° C. As a result, variation of measured temperature and variation of a thermal time constant were suppressed as follows.
Measured Temperature:
 82.7° C. to 89.1° C. (before forming process)->87.7° C. to 90.0° C. (after forming process)
Thermal Time Constant:
 19.6 s to 74.3 s (before forming process)->18.3 s to 25.4 s (after forming process)

Hereinbefore, although the temperature sensor 3 according to the second embodiment has been described, the mode in which the contact surface is formed in the mountain-folded shape is not limited to the temperature sensor 3. The modes are described with reference to FIGS. 12A to 12D.

Figure 12A:
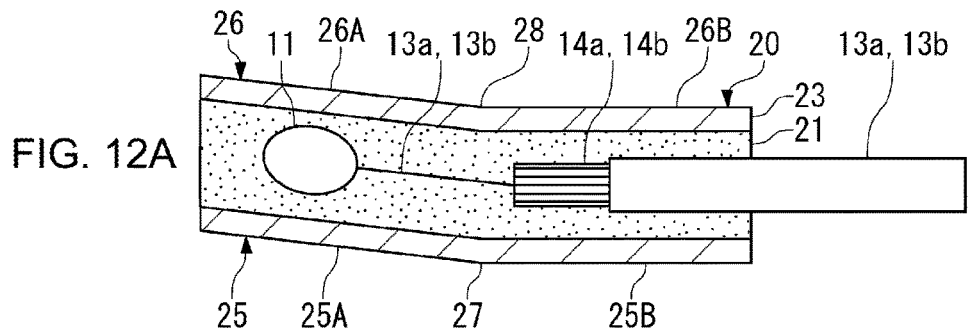
FIGS. 12A to 12D are diagrams each illustrating modifications of the temperature sensor according to the second embodiment.

First, in the temperature sensor 3, the ridgeline 27 is provided near the connection parts at which the element body 11 and the lead-out wires 12a and 12b are connected with each other. The present invention is not limited thereto, and the ridgeline 27 may be provided not close to the connection parts as illustrated in FIG. 12A. In this case, however, the ridgeline 27 may be preferably disposed in a region where the lead-out wires 12a and 12b are provided in the longitudinal direction X in order to obtain the effects of the heat transfer through the lead-out wires 12a and 12b mentioned above.

Figure 12B:
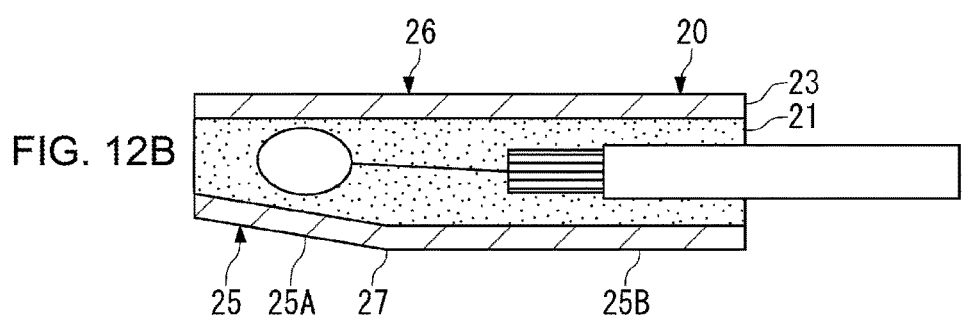

Also, in the temperature sensor 3, the outer surface 26 is formed in the valley-folded shape; however, the present invention is not limited thereto, and the outer surface 26 may be formed flat as illustrated in FIG. 12B. It is difficult, however, to deform the coating layer 20 into a straight shape only with the load applied to two points, the front end and the rear end. For example, it may be necessary to employ a device such as to form a part, of a member holding the coating layer 20, corresponding to the outer surface 26 in the mountain-folded shape. In addition, when the outer surface 26 is made flat, the thickness in the height direction Y is increased and a section modulus is accordingly increased as compared with the case where the outer surface 26 is formed in a valley-folded shape. This increases the load necessary for straightening deformation.

Figure 12C:
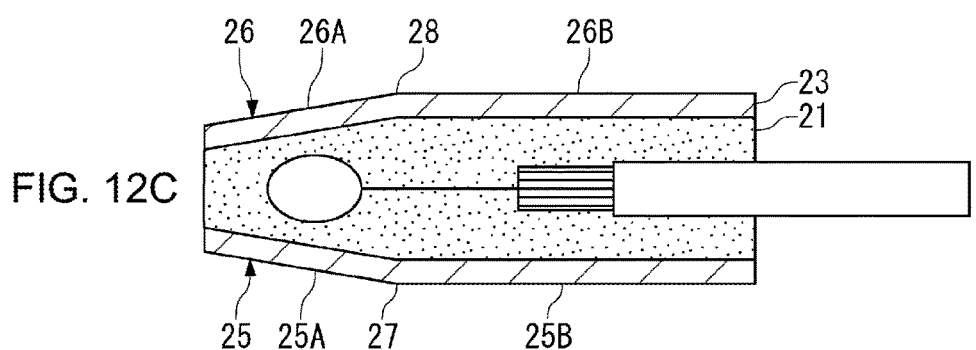

Further, in the temperature sensor 3, the outer surface 25 is formed in the mountain-folded shape, and the outer surface 26 is formed in the valley-folded shape; however, the present invention is not limited thereto. Alternatively, the outer surface 26 may be formed in the mountain-folded shape as illustrated in FIG. 12C, in addition to the outer surface 25.

Figure 12D:
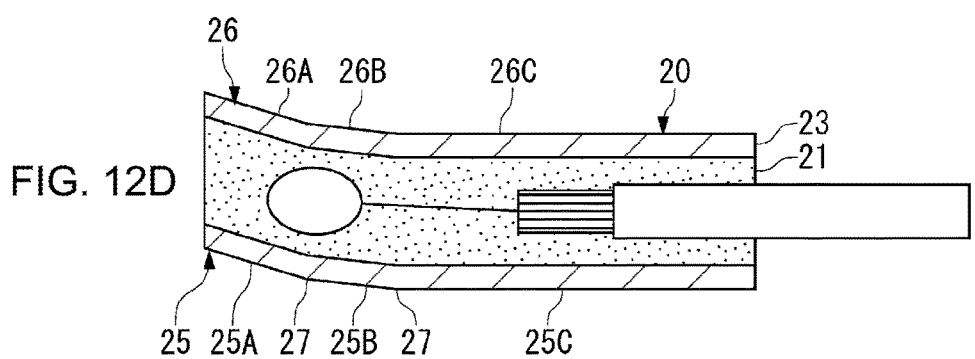

Furthermore, in the temperature sensor 3, one ridgeline 27 is provided on the outer surface 25. Alternatively, as illustrated in FIG. 12D, two ridgelines 27 may be provided on the outer surface 25 to segment the outer surface 25 into the first contact surface 25A, the second contact surface 25B, and a third contact surface 25C.

REFERENCE SIGNS LIST 1, 3 Temperature sensor
2 Sensor assembly
10 Thermistor element
11 Element body
12a, 12b Lead-out wire
13a, 13b Lead wire
14a, 14b Twisted wire
15a, 15b Coating
16a, 16b Connection part
20 Resin coating layer (coating layer)
20A First part
20B Second part
21 Inner layer
22 Precursor tube
23 Outer layer
24 Precursor tube
25 Outer surface
25A First contact surface
25B Second contact surface
25C Third contact surface
26 Outer surface
26A First counter surface
26B Second counter surface
27 Ridgeline
28 Trough line
100 Mold
101 Lower mold
102 Cavity
105 Upper mold
107a Lower mold
107b Upper mold
108a, 108b Roll
110 Mold
111 Lower mold
112 Cavity
113 Lower formation surface
113A First formation surface
113B Second formation surface
115 Upper mold
116 Pressing surface
116A First formation surface
116B Second formation surface
200 Temperature detection object
201 Temperature detected surface

What is claimed is:

1. A temperature sensor, comprising:
a thermistor element in which a pair of lead-out wires are connected to a thermistor;
lead wires respectively connected to the pair of lead-out wires; and
a resin coating layer covering the thermistor element and connection parts at which the lead-out wires are respectively connected to the lead wires, wherein
the resin coating layer includes an inner layer and an outer layer,
the inner layer seals the thermistor element and the connection parts and is made of an inner layer resin material, and
the outer layer is disposed around the inner layer, is made of an outer layer resin material that has heat shrinkability and a melting point higher than a melting point of the inner layer resin material, and has a flat outer surface,
wherein the outer layer having the flat outer surface is the outermost layer of the resin coating layer, and the outer layer is deformable in response to an application of load.

2. The temperature sensor according to claim 1, wherein the resin coating layer includes a rectangular cross-section.

3. The temperature sensor according to claim 1, wherein a space between the pair of lead-out wires and a space between the pair of lead wires including the connection parts are filled with the inner layer resin material to achieve insulation inside the inner layer.

4. The temperature sensor according to claim 1, wherein the flat outer surface includes a first contact surface that is inclined with respect to a longitudinal direction in which the lead-out wires are extended.

5. The temperature sensor according to claim 4, wherein the outer surface further includes a second contact surface that is inclined in the longitudinal direction, and the first contact surface and the second contact surface are formed to allow a ridgeline serving as a boundary between the first contact surface and the second contact surface, to be located in a region provided with the lead-out wires, in the longitudinal direction.

6. The temperature sensor according to claim 5, wherein the ridgeline is provided in proximity to the thermistor in the longitudinal direction.

7. The temperature sensor according to claim 5, wherein the outer surface at least includes a first outer surface and a second outer surface opposed to the first outer surface, the first outer surface including the first contact surface and the second contact surface, the first outer surface further including a convex part, the second outer surface including a concave part that has the same shape as the first outer surface and projects toward the first outer surface.

8. The temperature sensor according to claim 1, wherein the inner layer resin material is made of tetrafluoroethylene-perfluoroalkyl vinyl ether copolymer,
the outer layer resin material is made of polytetrafluoroethylene, and
the lead wire is coated with a coating material made of polytetrafluoroethylene.

9. A method of manufacturing the temperature sensor according to claim 1, the method comprising:
a tube covering step of covering the thermistor element and the connection parts with an inner layer tube made of the inner layer resin material, and covering surroundings of the inner layer tube with an outer layer tube made of the outer layer resin material to form a sensor assembly;
a sealing step of heating the sensor assembly to a temperature that is higher than the melting point of the inner layer resin material and lower than the melting point of the outer layer resin material, and sealing the thermistor element and the connection parts with the melted inner layer resin material; and
a molding step of molding the flat outer surface until the melted inner layer resin material is solidified.

10. The temperature sensor manufacturing method according to claim 9, wherein the molding step is press processing performed with use of a mold having a flat pressing surface.

11. The temperature sensor manufacturing method according to claim 9, further comprising a forming step of forming the resin coating layer molded in a straight shape in the molding step.

12. The temperature sensor manufacturing method according to claim 11, wherein, in the forming step, the resin coating layer is formed such that the flat outer surface includes a first contact surface and a second contact surface that are inclined to each other in a longitudinal direction in which the lead-out wires are extended.

* * * * *